(12) United States Patent
Cai

(10) Patent No.: US 9,777,081 B2
(45) Date of Patent: *Oct. 3, 2017

(54) POLYMER DERIVED FROM ACRYLONITRILE

(71) Applicant: COMMONWEALTH SCIENTIFIC AND INDUSTRIAL RESEARCH ORGANISATION, Campbell, Australian Capital Territory (AU)

(72) Inventor: Jackie Yun Cai, Wandana Heights (AU)

(73) Assignee: Commonwealth Scientific and Industrial Research Organisation, Campbell (AU)

( * ) Notice: Subject to any disclaimer, the term of this patent is extended or adjusted under 35 U.S.C. 154(b) by 0 days.

This patent is subject to a terminal disclaimer.

(21) Appl. No.: 15/210,546

(22) Filed: Jul. 14, 2016

(65) Prior Publication Data

US 2016/0319051 A1    Nov. 3, 2016

Related U.S. Application Data

(62) Division of application No. 14/213,130, filed on Mar. 14, 2014, now Pat. No. 9,458,263.

(Continued)

(51) Int. Cl.
*C08F 2/00* (2006.01)
*C08F 20/44* (2006.01)
(Continued)

(52) U.S. Cl.
CPC ............ *C08F 20/44* (2013.01); *C08F 120/44* (2013.01); *C08F 220/44* (2013.01); *D01F 9/22* (2013.01); *C08F 2438/03* (2013.01)

(58) Field of Classification Search
CPC .......... D01F 9/22; C08F 20/44; C08F 120/44; C08F 220/14; C08F 220/44; C08F 2438/03
(Continued)

(56) References Cited

U.S. PATENT DOCUMENTS 3,098,060 A    7/1963  Miller et al.
7,205,362 B2 *    4/2007  Favier .................... C08F 2/00
                                                     526/219.6

(Continued)

FOREIGN PATENT DOCUMENTS

CN        101885816 A    11/2010
CN        102605475 A     7/2012
WO    WO 2013/131216 A1   9/2013

OTHER PUBLICATIONS

Niu, S. et al., "Synthesis of High Molecular Weight and Narrow Molecular Weight Distribution Poly(acrylonitrile) via RAFT Polymerization", Journal of Polymer Science, Part A: Polymer Chemistry, 2013, vol. 51, pp. 1197-1204.*

(Continued)

*Primary Examiner* — William Cheung
(74) *Attorney, Agent, or Firm* — Arent Fox LLP

(57) ABSTRACT

This invention relates to poly(acrylonitrile) homo- or co-polymer having a number average molecular weight ($M_n$) of at least 200,000 g/mol and a dispersity (Đ) of less than 1.3.

11 Claims, 1 Drawing Sheet

Related U.S. Application Data

(60) Provisional application No. 61/799,506, filed on Mar. 15, 2013.

(51) Int. Cl.
  *C08F 20/50* (2006.01)
  *C01B 31/06* (2006.01)
  *D01F 9/22* (2006.01)
  *C08F 120/44* (2006.01)
  *C08F 220/44* (2006.01)

(58) Field of Classification Search
  USPC ......... 526/214; 525/329.1, 329.2; 423/447.2, 423/447.1
  See application file for complete search history.

(56) References Cited

U.S. PATENT DOCUMENTS

2006/0004160 A1   1/2006   Favier et al.
2009/0312505 A1   12/2009  Matyjaszewski et al.

OTHER PUBLICATIONS

An, Q, et al., "Rapid Communication: Study on Kinetics of Controlled/Living Radical Polymerization of Acrylonitrile by RAFT Technique", Journal of Polymer Science: Part A: Polymer Chemistry, 2005, vol. 43, pp. 1973-1977.

An, Q. et al., "Synthesis and Characterization of the Polyacrylonitrile-block-poly(methyl acrylate) by RAFT Technique", Chinese Chemical Letters, 2006, vol. 17, No. 3, pp. 365-368.

Chernikova, E.V. et al., "Controlled Synthesis of Polyacrylonitrile via Reversible Addition-Fragmentation Chain-Transfer Pseudoliving Radical Polymerization and Its Thermal Behavior", Polymer Science, Ser B, 2011, vol. 53, Nos. 7-8, pp. 391-403.

Dong, H. et al., "Well-Defined High Molecular-Weight Polyacrylonitrile via Activators Regenerated by Electron Transfer ATRP", American Chemical Society, Macromolecules, 2007, vol. 40, pp. 2974-2977.

International Search Report issued May 22, 2014; International Application No. PCT/AU2014/000267.

Liu, X, et al., "Well-defined higher-molecular-weight polyacrylonitrile via RAFT technique in the presence of disulfide compounds as a source of chain transfer agent", European Polymer Journal, 2008, vol. 44, pp. 1200-1208.

Liu, X. et al., "2-Cyanoprop-2-yl Dithiobenzoate Mediated Reversible Addition-Fragmentation Chain Transfer Polymerization of Acrylonitrile Targeting a Polymer with a Higher Molecular Weight", Journal of Polymer Science: Part A: Polymer Chemistry, 2007, vol. 45, pp. 1272-1281.

Moad, G. et al., "Living Radical Polymerization by the RAFT Process—A Second Update", Aust J. Chem., 2009, vol. 62, pp. 1402-1472.

Pietrasik, J. et al., "Synthesis of High Molecular Weight Poly(styrene-co-acrylonitrile) Copolymers with Controlled Architecture", American Chemical Society, Macromolecules, 2006, vol. 39, pp. 6384-6390.

Quinn, J.F. et al., "Living Free-Radical Polymerization of Styrene under a Constant Source of ? Radiation", Journal of Polymer Science: Part A: Polymer Chemistry, 2002, vol. 40, pp. 19-25.

Tang, C. et al., "RAFT Polymerization of Acrylonitrile and Preparation of Block Copolymers Using 2-Cyanoethyl Dithiobenzoate as the Transfer Agent", American Chemical Society, Macromolecules, 2003, vol. 36, pp. 8587-8589.

\* cited by examiner

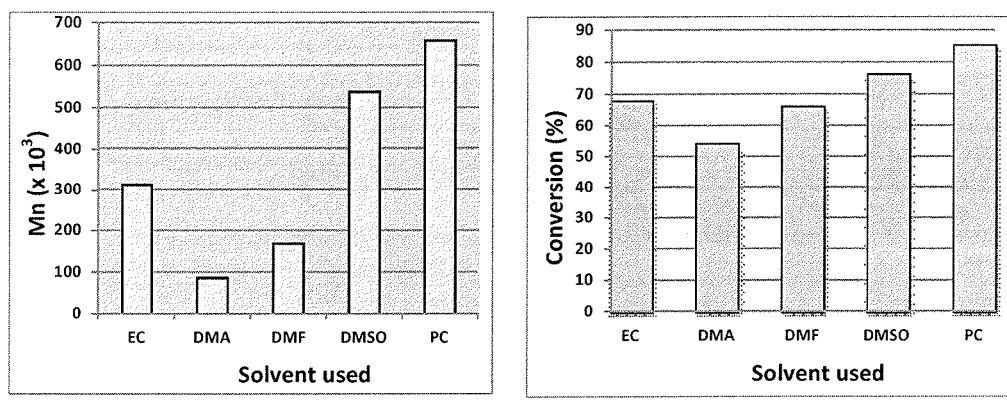

US 9,777,081 B2

POLYMER DERIVED FROM ACRYLONITRILE

CROSS-REFERENCE TO RELATED APPLICATION

This application is a Divisional of U.S. patent application Ser. No. 14/213,130, filed Mar. 14, 2014, now U.S. Pat. No. 9,458,263, which claims the benefit of priority of the U.S. Provisional Application No. 61/799,506, filed Mar. 15, 2013. The disclosure of the prior application of which is hereby incorporated in its entirety by reference.

FIELD OF THE INVENTION

The present invention relates in general to polymer derived from acrylonitrile monomer. In particular, the invention relates to poly(acrylonitrile) homo- and co-polymers, to a method for producing the same, to carbon fibre comprising carbonised residue of the polymer, and to a method for producing the carbon fibre. The poly(acrylonitrile) homo- and co-polymers according to the invention have been found to be particularly suitable for use in the manufacture carbon fibre, and it will therefore be convenient to describe the invention with particular reference to this application. However, it is to be understood that the poly(acrylonitrile) homo- and co-polymers according to the invention may be used in a variety of other applications.

BACKGROUND OF THE INVENTION

Poly(acrylonitrile) (PAN) is a synthetic, semi crystalline organic polymer that typically has a linear structure of general formula $(C_3H_3N)_n$. Commercially, PAN is often produced in the form of a co-polymer with one or more other ethylenically unsaturated monomers.

Although PAN-based polymers are generally thermoplastic, they may not go through a molten transition under normal conditions, but rather degrade prior to melting.

PAN-based polymers are particularly versatile and are used to manufacture numerous products including filtration membranes, and fibres having a diverse range of applications.

PAN-based fibres have been found to be particularly suited for use in the manufacture of carbon fibre. This typically involves first thermally oxidising PAN-based fibre in air to form oxidised PAN fibre which is then carbonised at high temperature in an inert atmosphere to make the carbon fibre.

The properties of carbon fibre, such as high stiffness, high tensile strength, low weight, high chemical resistance, high temperature tolerance and low thermal expansion, make it particularly suitable for use in aerospace, civil engineering, military, automotive and sporting applications.

In use, carbon fibres are typically combined with a polymer resin to form a composite structure. The resulting composite structures are renowned for having a very high strength-to-weight ratio.

Because of its unique properties, PAN-based polymer is particularly well suited for use in the manufacture of carbon fibre. Despite being used for many years as a precursor material in the manufacture of carbon fibre, those skilled in the art will be aware that acrylonitrile presents numerous challenges in the manufacture of PAN-based polymers. In particular, due to the high reactivity of acrylonitrile and the poor solubility of PAN-based polymers, the controlled polymerisation of acrylonitrile has presented a significant challenge to polymer scientists.

PAN-based polymers have traditionally been produced by conventional free radical polymerisation, the process of which offers limited control over the molecular weight and dispersity of the resulting polymer.

Increasing the molecular weight while maintaining a low dispersity of PAN-based polymers is believed to play an important role in enhancing certain properties of products, such as carbon fibre, derived from the polymer.

Accordingly, considerable research effort has to date been directed toward improved methodology for producing PAN-based polymer.

Anionic polymerisation techniques have been applied with some success to produce relatively well-defined PAN-based polymer. However, the techniques employed require relatively harsh polymerisation conditions that would present as major limitations to adopting the technology commercially. Furthermore, the technique has only provided for a relatively modest gain in molecular weight over other known techniques.

In more recent times, considerable attention has focussed on using so called living or controlled radical polymerisation techniques to prepare PAN-based polymers. The use of such techniques has resulted in an ability to produce PAN-based polymers with an increase molecular weight and a relatively low dispersity. For example atom transfer radical polymerisation (ATRP) has been used to prepare PAN with a molecular weight ($M_n$) of about 120,000 g/mol and a dispersity ($M_w/M_n$) of about 2 (Journal of Polymer Science Part A: Polymer Chemistry Volume 51, Issue 2, pages 340-346, 2013).

Despite offering improvements in the preparation of PAN-based polymers, most of the ATRP techniques developed to date inherently introduce transition metal residues into the resulting polymer. The presence of such transition metal residues can be detrimental in certain applications for the polymer, for example in the manufacture of carbon fibre.

Other living/controlled radical polymerisation techniques have also been applied with some success. For example, Reversible Addition-Fragmentation chain Transfer (RAFT) polymerisation has been employed in the manufacture of the PAN-based polymers. For example, producing PAN with a $M_n$ of about 33,000 g/mol and a dispersity of 1.29 by RAFT polymerisation was considered to be a significant achievement (Journal of Polymer Science Part A: Polymer Chemistry Volume 45, Issue 7, pages 1272-1281, 2007). 2007). In another example, producing PAN with a Mn of 200,000 g/mol and dispersity of 1.7-2.0 by RAFT polymerisation was also claimed as a significant progress (European Polymer Journal, Volume 44, Pages 1200-1208, 2008).

Those skilled in the art will appreciate that as the $M_n$ of a given polymer increases it becomes increasingly difficult to maintain a low dispersity. In the manufacture of PAN-based polymers it has proven difficult to not only produce polymers having a $M_n$ of greater than 100,000 g/mol but also to maintain the dispersity of the polymer below about 1.35. In such an environment an ability to produce PAN-based polymers with only a modest increase in $M_n$ while maintaining a low dispersity is considered in the art to be a significant achievement.

Accordingly, there remains an opportunity to develop PAN-based polymers that exhibit improved properties such as increased molecular weight with low dispersity.

SUMMARY OF THE INVENTION

The present invention therefore provides poly(acrylonitrile) homo- or co-polymer having a number average molecular weight ($M_n$) of at least 200,000 g/mol and a dispersity (Đ) of less than 1.3.

Considerable research to date has failed to provide for PAN-based polymers having a high $M_n$ and a low dispersity. It has now been found that PAN-based polymers can indeed be prepared having a $M_n$ of at least 200,000 g/mol and a dispersity of less than 1.3. This achievement is believed to represent a significant advance in PAN-based polymer technology.

By offering a unique molecular structure profile (i.e. high $M_n$ and low dispersity), the PAN-based polymers according to the present invention are believed to impart improved properties to polymer and carbon fibres derived therefrom.

Accordingly, the invention further provides carbon fibre comprising carbonised residue of poly(acrylonitrile) homo- or co-polymer having a number average molecular weight ($M_n$) of at least 200,000 g/mol and a dispersity (Đ) of less than 1.3.

Carbon fibre in accordance with the invention is believed to advantageously exhibit improved modulus and tensile strength properties relative to equivalent PAN-based polymers having a lower $M_n$ and/or a higher dispersity.

The present invention also provides a method for producing poly(acrylonitrile) homo- or co-polymers by RAFT polymerisation, the method comprising polymerising acrylonitrile and optionally one or more ethylenically unsaturated co-monomers under the control of a RAFT agent, wherein the mole ratio of the polymerisable monomers to the RAFT agent is at least 1,000.

Conventional techniques for producing PAN-based polymers by RAFT polymerisation have typically utilised a mole ratio of monomer to RAFT agent of no more than about 400 and a mole ratio of RAFT agent to initiator in the range of about 5 to 10. Surprisingly, it has now been found that a increase in the monomer to RAFT agent ratio and/or a decrease in the RAFT agent to initiator ratio can advantageously facilitate the production of PAN-based polymers having a high $M_n$ and a low dispersity.

In one embodiment, the method according to the invention is for producing by RAFT polymerisation poly(acrylonitrile) homo- or co-polymer having a number average molecular weight ($M_n$) of at least 200,000 and a dispersity (Đ) of less than 1.3.

Dithiobenzoate and trithiocarbonate RAFT agents have been found to be particularly well suited to producing the PAN-based polymers according to the invention.

In one embodiment, the poly(acrylonitrile) homo- or co-polymer according to the invention is a RAFT polymer. In a further embodiment, the poly(acrylonitrile) homo- or co-polymer is a RAFT polymer and has covalently bound thereto a dithiobenzoate or trithiocarbonate RAFT agent residue.

In another embodiment, the RAFT agent used in accordance with the method of the invention is a dithiobenzoate or trithiocarbonate RAFT agent.

The present invention also provides a method of producing carbon fibre, the method comprising carbonising a fibre comprising poly(acrylonitrile) homo- or co-polymer having a number average molecular weight ($M_n$) of at least 200,000 and a dispersity (Đ) of less than 1.3.

In addition to providing for PAN-based polymer having a number average molecular weight ($M_n$) of at least 200,000 and a dispersity (Đ) of less than 1.3, the present invention also advantageously provides for PAN-based polymer having even lower dispersity.

The present invention therefore also provides poly(acrylonitrile) homo- or co-polymer having a number average molecular weight ($M_n$) of at least 150,000 g/mol and a dispersity (Đ) of less than 1.25, or of at least 100,000 g/mol and a dispersity (Đ) of less than 1.2.

Further aspects and/or embodiments of the invention are discussed in more detail blow.

BRIEF DESCRIPTION OF THE DRAWINGS

The invention will herein be described with reference to the following non-limiting drawings in which:

FIG. 1 illustrates the effect of the solvent used on the molecular weight and yield of the PAN obtained under the same polymerisation conditions (AN=5 mol/L, AIBN=$1.60 \times 10^{-3}$ mol/L).

DETAILED DESCRIPTION OF THE INVENTION

The present invention relates in general to poly(acrylonitrile) homo- or co-polymers. For convenience, these polymers may herein be referred to as "PAN-based" polymers. Those skilled in the art will appreciate that a PAN homopolymer consists essentially of polymerised acrylonitrile monomer residues. A PAN co-polymer will comprise polymerised residues of acrylonitrile and one or more other co-monomer polymerised residues.

By being a PAN co-polymer is meant that the co-polymer will comprise greater than 50 wt. % of polymerised acrylonitrile monomer residues.

A PAN co-polymer in accordance with the invention will generally comprise 70-99 wt. % polymerised residue of acrylonitrile and 1-30 wt. % polymerised residue of one or more other ethylenically unsaturated co-monomers.

PAN-based polymers according to the invention have a number average molecular weight ($M_n$) of at least 100,000 g/mol, at least 150,000 g/mol, at least 200,000 g/mol. As used herein, the $M_n$ of the PAN-based polymers is intended to be that which is measured using Gel Permeation Chromatography (GPC), where dimethylacetamide (DMA) is used as eluent, and polymethylmethacrylate (PMMA) as standards.

In one embodiment, where the dispersity (Đ) is less than 1.3, the $M_n$ of the PAN-based polymers may be at least 225,000, or at least 250,000, or at least 275,000, or at least 300,000, or at least 325,000, or at least 350,000, or at least 375,000, or at least 400,000, or at least 425,000, or at least 450,000 g/mol. In a further embodiment, the $M_n$ ranges from at least 200,000 g/mol to about 800,000 g/mol, or at least 200,000 g/mol to about 600,000 g/mol.

In another embodiment, where the dispersity (Đ) is less than 1.25, the $M_n$ of the PAN-based polymers may be at least 160,000, or at least 170,000, or at least 180,000, or at least 190,000, or at least 200,000 g/mol. In a further embodiment, the $M_n$ ranges from at least 150,000 g/mol to about 800,000 g/mol, or at least 150,000 g/mol to about 600,000 g/mol.

In a further embodiment, where the dispersity (Đ) is less than 1.20, the $M_n$ of the PAN-based polymers may be at least 110,000, or at least 120,000, or at least 130,000, or at least 140,000, or at least 150,000 g/mol. In a further embodiment, the $M_n$ ranges from at least 100,000 g/mol to about 800,000 g/mol, or at least 100,000 g/mol to about 600,000 g/mol.

In addition to having a high $M_n$, the PAN-based polymers according to the invention also have a low dispersity (Đ) of less than 1.3.

As used herein, the dispersity (Đ) of the PAN-based polymers is determined according to equation (1):

$$Đ = M_w/M_n \qquad (1)$$

where $M_w$ is the mass average molecular weight, and $M_n$ is as herein defined.

$M_w$ referred to herein is intended to be that as determined by GPC in a similar manner to that outlined above in respect of determining $M_n$.

In one embodiment, the PAN-based polymers according to the invention have a dispersity no greater than 1.28, or no greater than 1.26, or no greater than 1.25, or no greater than 1.24, or no greater than 1.22, or no greater than 1.20, or no greater than 1.18, or no greater than 1.16, or no greater than 1.14, or no greater than 1.12. In a further embodiment, the PAN-based polymers according to the invention have a dispersity ranging from about 1.05 to less than 1.3, or from about 1.1 to less than 1.3, or from about 1.12 to less than 1.3.

Where the PAN-based polymer according to the invention is a homo-polymer, it will be appreciated that the polymer will consist essentially of polymerised residues of acrylonitrile.

Where the PAN-based polymer is a co-polymer, it will generally comprise greater than 50 wt. % of polymerised acrylonitrile monomer residues, with the remaining polymerised monomers residues being derived from one or more other co-monomers.

In one embodiment, the PAN-based polymer is a PAN co-polymer comprising the polymerised residue of one or more co-monomers other than acrylonitrile in an amount of no more than about 30 wt. %, or no more than about 20 wt. %, or no more than about 15 wt. %, or no more than about 10 wt. %, or no more than about 8 wt. %, or no more than about 6 wt. %, or no more than about wt. %, or no more than about 2 wt. %, or no more than about 1 wt. %, relative to the total amount of polymerised monomer residue.

In a further embodiment, a PAN co-polymer according to the invention comprises polymerised co-monomer residue other than acrylonitrile in an amount of about 1 to about 30 wt. %, or about 1 to about 20 wt. %, or about 1 to about 15 wt. %, or about 1 to about 10 wt. %, or about 1 to about 8 wt. %, or about 1 to about 6 wt. %, or about 1 to about 4 wt. %, or about 1 to about 3 wt. %, or about 1 to about 2 wt. %, relative to the total amount of polymerised monomer residue.

RAFT polymerisation has been found to be particularly well suited for producing PAN-based polymers according to the invention. Accordingly, in one embodiment the PAN-based polymer is a RAFT polymer. In that case, the invention provides a poly(acrylonitrile) RAFT homo- or co-polymer.

As used herein, the expression "RAFT polymer" or "RAFT homo- or co-polymer" is intended to mean a polymer that has been prepared by RAFT polymerisation (i.e. polymer that is formed by polymerisation of monomer under the control of a RAFT agent).

Those skilled in the art will appreciate that polymer formed by RAFT polymerisation will contain (unless it has otherwise been removed) a covalently bound residue of the RAFT agent.)

It has been found that dithiobenzoate and trithiocarbonate RAFT agents are particularly well suited for producing PAN-based polymers according to the invention.

Accordingly, in one embodiment the PAN-based polymer comprises a covalently bound residue of a dithiobenzoate or trithiocarbonate RAFT agent.

Dithiobenzoate and trithiocarbonate RAFT agents that contain a cyano group (—CN), a carboxylic acid group (—COOH) or both of such groups have been found to be particularly well suited for producing the PAN-based polymers according to the invention.

Accordingly, in a further embodiment the PAN-based polymers comprise a cyano functionalised, carboxylic acid functionalised, or cyano and carboxylic acid functionalised dithiobenzoate or trithiocarbonate RAFT agent residue covalently bound thereto.

Specific examples of RAFT agents that are well suited for producing PAN co-polymers according to the invention may be selected from:

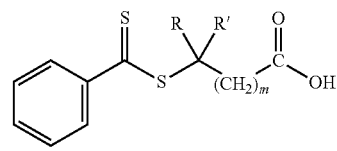

(1)

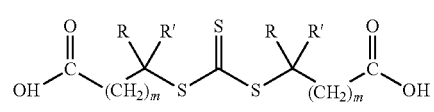

(2)

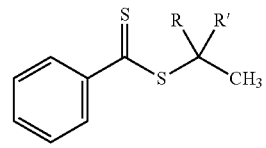

(3)

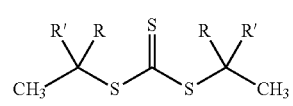

(4)

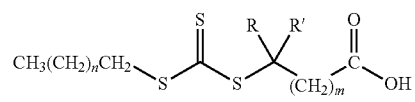

(5)

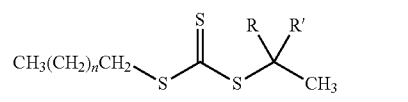

(6)

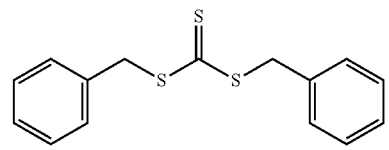

(7)

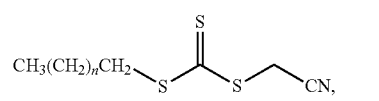

(8)

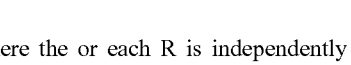

where the or each R is independently selected from H or $CH_3$, the or each R' is independently selected from H, $CH_3$, or CN, n=0-15, 4-10, or 10; and m=0-10, 1-5, or 2.

Suitable RAFT agents may also be derived from the following disulphide precursor compounds:

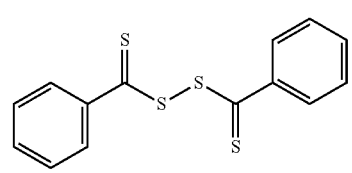

(9)

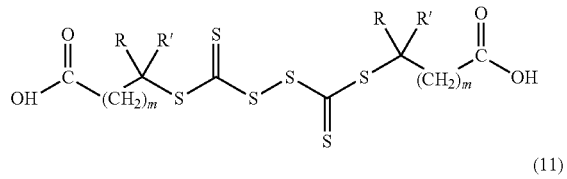

(10)

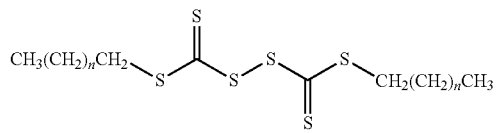

(11)

Accordingly, in one embodiment the PAN-based polymers have covalently bound thereto a residue of a RAFT agent selected from 1-8 or a precursor compound selected from 9-11. In a further embodiment, the PAN-based polymers have covalently bound thereto a residue of RAFT agent (1) or (5), where R=H or $CH_3$, R'=CN, m=2, and n=10.

PAN-based polymers according to the invention can be provided in a variety of physical forms. For example, the polymer may be formed into fibre. When in the form of fibre, the PAN-based polymer is well suited for use in the manufacture of carbon fibre. Such fibre can advantageously be used in a conventional carbon fibre manufacturing process. Fibre produced from PAN-based polymers according to the invention has been found to advantageously exhibit uniform diameter. Carbon fibre produced from PAN-based polymers according to the invention are expected to exhibit improved modulus and tensile properties.

The present invention is therefore also directed PAN-based polymers according to the invention in the form of fibre.

The present invention is also directed toward carbon fibre comprising carbonised residue of PAN-based polymers according to the invention.

The present invention also provides a method for producing poly(acrylonitrile) homo- or co-polymer by RAFT polymerisation. The method comprises polymerising acrylonitrile and optionally one or more ethylenically unsaturated co-monomers under the control of a RAFT agent.

Of the total amount of monomer polymerised to form the PAN-based polymers, acrylonitrile will generally be used in an amount greater than 50 wt. %.

There is no particular limitation on the type of co-monomer that may be used in accordance with the invention provided that it can be suitably polymerised with acrylonitrile. Those skilled in the art will be able to select suitable co-monomers for this task. Specific examples of co-monomers that may be used include acrylic acid, methacrylic acid, itaconic acid, allysulfonic acid, and maleic acid, crotonic acid, acrylic acid methylester, methacrylic acid ethylester, ammonium itaconate, ammonia acrylate, butyl methacrylate, propyl acrylate, stearyl acrylate, and isobutyl methacrylates, methyl methacrylate, ethyl methacrylate, vinyl acetate, or methyl acrylate, vinyl chloride, vinylidine chloride, styrene, acylamide, methacrylamide, 3-ammoniumcarboxylate-3-butenoic acid methyl ester, and combinations thereof.

In one embodiment, the method according to the invention produces a PAN co-polymer, and the amount of co-monomer used is no more than about 30 wt. %, no more than about 20 wt. %, no more than about 15 wt. %, no more than about 10 wt. %, or no more than about 8 wt. %, or no more than about 6 wt. %, or no more than about 4 wt. %, or no more than about 2 wt. %, or no more than about 1 wt. %, relative to the total mol % of monomer polymerised. In a further embodiment, the amount of corn-monomer used ranges from about 1 to about 30 wt. %, or 1 to about 20 wt. %, or 1 to about 15 wt. %, or 1 to about 10 wt. %, or about 1 to about 8 wt. %, or about 1 to about 6 wt. %, or about 1 to about 4 wt. %, or about 1 to about 3 wt. %, or about 1 to about 2 wt. %, relative to the total mol % of monomer used.

The method of the invention is well suited to producing poly(acrylonitrile) homo- or co-polymer having a number average molecular weight ($M_n$) of at least 200,000 g/mol and a dispersity (Đ) of less than 1.3, or poly(acrylonitrile) homo- or co-polymer having a number average molecular weight ($M_n$) of at least 150,000 g/mol and a dispersity (Đ) of less than 1.25, or of at least 100,000 g/mol and a dispersity (Đ) of less than 1.2, as described herein.

The monomers used in accordance with the method of the invention are polymerised under the control of a RAFT agent. By being polymerised "under the control" of the RAFT agent is meant that the monomers are polymerised via a Reversible Addition-Fragmentation chain Transfer (RAFT) mechanism to form polymer.

RAFT polymerisation of ethylenically unsaturated monomers is described in WO 98/01478, and in effect is a radical polymerisation technique that enables polymers to be prepared having a well defined molecular architecture and low dispersity.

As previously mentioned, despite RAFT polymerisation being renowned for providing polymers having a well defined molecular architecture and low dispersity, imparting such properties to the polymerisation of acrylonitrile has remained a significant challenge to polymer scientists. Most notably, until recently it has not been possible to prepare PAN-based polymers having a $M_n$ greater than about 33,000 g/mol and a dispersity of less than 1.29, even by RAFT polymerisation. The present invention surprisingly and advantageously has met this challenge.

Without wishing to be limited by theory, it is believed that the selection of a particular RAFT agent or precursor thereto may also facilitate in providing for PAN-based polymers having a high $M_n$ and a low dispersity.

In one embodiment, the RAFT agent or precursor thereto used in the method of the invention is selected from a dithiobenzoate and trithiocarbonate RAFT agent.

Dithiobenzoate and trithiocarbonate RAFT agents or precursors thereto that contain a cyano group (—CN), a carboxylic acid group (—COOH) or both of such groups have been found to be particularly well suited for producing the PAN-based polymers according to the invention.

Accordingly, in a further embodiment the RAFT agent or precursor thereto used in the method of the invention is selected from a cyano functionalised, carboxylic acid functionalised, or cyano and carboxylic acid functionalised dithiobenzoate or trithiocarbonate RAFT agent or RAFT agent precursor compound.

Specific examples of RAFT agents or RAFT agent precursor compounds that are well suited for use in the method of the invention include those herein defined.

In one embodiment the RAFT agent used in the method of the invention is selected compounds 1-8. In another embodiment, the RAFT agent used in the method of the invention is derived from a precursor compound selected from compounds 9-11. In a further embodiment, the RAFT agent used in the method of the invention is selected from compounds (1) or (5), where R=H or $CH_3$, R'=CN, m=2, and n=10.

According to the method of the invention, the mole ratio of the polymerisable monomer used to the RAFT agent used is at least 1,000. Where a RAFT agent precursor compound is used in the method, this ratio relates to the RAFT agent derived from the precursor compound. Without wishing to be limited by theory, it is believed that providing monomer in a significant excess to what would conventionally be employed facilitates formation of polymer having a high $M_n$ and a low dispersity.

In one embodiment, the mole ratio of the polymerisable monomer to the RAFT agent is at least about 1,500, or at least about 2,000, or at least about 2,500, or at least about 3,000, or at least about 3,500, or at least about 4,000, or at least about 5,500, or at least about 6,000, or at least about 6,500, or at least about 7,000, or at least about 7,500, or at least about 8,000. In a further embodiment the mole ratio of polymerisable monomer to the mole ratio of RAFT agents ranges from about 1,000 to about 10,000, or about 2,000 to about 8,000, or about 4,000 to about 8,000.

The polymerisation will usually require initiation from a source of free radicals. The source of initiating radicals can be provided by any suitable method of generating free radicals, such as the thermally induced homolytic scission of suitable compound(s) (thermal initiators such as peroxides, peroxyesters, or azo compounds), the spontaneous generation from monomers (e.g. styrene), redox initiating systems, photochemical initiating systems or high energy radiation such as electron beam, X- or gamma-radiation. The initiating system is chosen such that under the reaction conditions there is no substantial adverse interaction of the initiator or the initiating radicals with the monomers being polymerised.

Thermal initiators are chosen to have an appropriate half life at the temperature of polymerisation. These initiators can include one or more of the following compounds:

2,2'-azobis(isobutyronitrile), 2,2'-azobis(2-cyanobutane), dimethyl 2,2'-azobis(isobutyrate), 4,4'-azobis(4-cyanovaleric acid), 1,1'-azobis(cyclohexanecarbonitrile), 2-(t-butylazo)-2-cyanopropane, 2,2'-azobis{2-methyl-N-[1,1-bis(hydroxymethyl)-2-hydroxyethyl]propionamide}, 2,2'-azobis[2-methyl-N-(2-hydroxyethyl)propionamide], 2,2'-azobis(N,N'-dimethyleneisobutyramidine)dihydrochloride, 2,2'-azobis(2-amidinopropane)dihydrochloride, 2,2'-azobis(N,N'-dimethyleneisobutyramidine), 2,2'-azobis{2-methyl-N-[1,1-bis(hydroxymethyl)-2-hydroxyethyl] propionamide}, 2,2'-azobis{2-methyl-N-[1,1-bis(hydroxymethyl)-2-ethyl]propionamide}, 2,2'-azobis[2-methyl-N-(2-hydroxyethyl)propionamide], 2,2'-azobis(isobutyramide)dihydrate, 2,2'-azobis(2,2,4-trimethylpentane), 2,2'-azobis(2-methylpropane), t-butyl peroxyacetate, t-butyl peroxybenzoate, t-butyl peroxyneodecanoate, t-butylperoxy isobutyrate, t-amyl peroxypivalate, t-butyl peroxypivalate, diisopropyl peroxydicarbonate, dicyclohexyl peroxydicarbonate, dicumyl peroxide, dibenzoyl peroxide, dilauroyl peroxide, potassium peroxydisulfate, ammonium peroxydisulfate, di-t-butyl hyponitrite, dicumyl hyponitrite. This list is not exhaustive.

Photochemical initiator systems are chosen to have the requisite solubility in the reaction medium and have an appropriate quantum yield for radical production under the conditions of the polymerisation. Examples include benzoin derivatives, benzophenone, acyl phosphine oxides, and photo-redox systems.

Redox initiator systems are chosen to have the requisite solubility in the reaction medium and have an appropriate rate of radical production under the conditions of the polymerisation; these initiating systems can include, but are not limited to, combinations of the following oxidants and reductants:

oxidants: potassium, peroxydisulfate, hydrogen peroxide, t-butyl hydroperoxide.

reductants: iron (II), titanium (III), potassium thiosulfite, potassium bisulfite.

Other suitable initiating systems are described in recent texts. See, for example, Moad and Solomon "the Chemistry of Free Radical Polymerisation", Pergamon, London, 1995, pp 53-95.

Initiators which have an appreciable solubility in a more hydrophilic reaction medium typically include, but are not limited to, 4,4-azobis(cyanovaleric acid), 2,2'-azobis{2-methyl-N-[1,1-bis(hydroxymethyl)-2-hydroxyethyl]propionamide}, 2,2'-azobis[2-methyl-N-(2-hydroxyethyl)propionamide], 2,2'-azobis(N,N'-dimethyleneisobutyramidine), 2,2'-azobis(N,N'-dimethyleneisobutyramidine)dihydrochloride, 2,2'-azobis(2-amidinopropane)dihydrochloride, 2,2'-azobis{2-methyl-N-[1,1-bis(hydroxymethyl)-2-ethyl]propionamide}, 2,2'-azobis[2-methyl-N-(2-hydroxyethyl) propionamide], 2,2'-azobis(isobutyramide)dihydrate, and derivatives thereof.

Initiators which have an appreciable solubility in a more hydrophobic reaction medium typically include oil soluble initiators such as azo compounds exemplified by the well known material 2,2'-azobisisobutyronitrile. Other readily available initiators are acyl peroxides such as acetyl and benzoyl peroxide as well as alkyl peroxides such as cumyl and t-butyl peroxides. Hydroperoxides such as t-butyl and cumyl hydroperoxides may also be used.

The source of initiating radicals will generally be provided by an initiator compound per se rather than from the spontaneous generation of radicals from monomers.

Without wishing to be limited by theory, it is believed that selecting a particular mole ratio of RAFT agent to initiator may also facilitate in providing for PAN-based polymers having a high $M_n$ and a low dispersity.

In a further embodiment, the method of the invention further comprises initiating the polymerisation using an initiator compound, wherein the mole ratio of the RAFT agent to initiator compound is no more than about 3, or no more than 2.8, or no more than about 2.5, or no more than about 2.2, or no more than about 2. In a further embodiment, the mole ratio of RAFT agent to initiator compound ranges from about 0.5 to about 3, or from about 1 to about 3.

In another embodiment the initiator compound is an azo compound such as 2,2'-azobis(isobutyronitrile) (AIBN).

The method according to the invention can advantageously be performed using conventional RAFT polymerisation techniques and equipment. The polymerisation may be performed in solution (e.g. using a suitable solvent), or as a suspension or emulsion polymerisation.

In one embodiment, the polymerisation is a solution polymerisation conducted in a suitable reaction medium or solvent. Without wishing to be limited by theory, it is believed that the selection of a suitable reaction medium or solvent may also facilitate providing for PAN-based polymers having a high $M_n$ and a low dispersity.

In one embodiment, the polymerisation is performed in a reaction medium selected from dimethylsulfoxide (DMSO), dimethylformamide (DMF), dimethylactetamide (DMA), ethylene carbonate (EC), propylene carbonate (PC) or combinations thereof.

In another embodiment, the polymerisation is performed in a reaction medium selected from dimethylsulfoxide (DMSO), ethylene carbonate (EC), propylene carbonate (PC) or combinations thereof.

In a further embodiment, the polymerisation is performed using PC as the reaction medium. Surprisingly, PC has been found to not only provide for PAN-based polymers having a very high $M_n$ and a low dispersity, but the % conversion of monomer into polymer has also been excellent. PC is also advantageously relatively non-toxic.

In addition to factors such as the polymerisable monomer to RAFT agent mole ratio, the selection of the RAFT agent, the RAFT agent to initiate a compound mole ratio and the selection of reaction medium or solvent, without wishing to be limited by theory it is believed that the selection of polymerisation temperature may also facilitate providing for PAN-based polymers having a high $M_n$ and a low dispersity.

Accordingly, in a further embodiment, the polymerisation is conducted at a temperature of no more than 80° C., or no more than 70° C., or no more than 65° C., or no more than 60° C., or no more than 55° C., or no less than about 50° C. In a further embodiment, the polymerisation is conducted at a temperature within the range of 60° C. to 70° C., or 60° C. to 65° C.

The method according to the invention may further comprise forming the resulting PAN-based polymer into fibre. Formation of such fibre can be achieved using techniques known in the art such as wet spinning, electrospinning and melt spinning.

In a further aspect, the present invention provides a method of forming poly(acrylonitrile) homo- or co-polymer fibre, said method comprising wet spinning, electrospinning or melt spinning poly(acrylonitrile) homo- or co-polymer according to the invention.

In one embodiment, the PAN-based polymer according to the invention is provided in the form of fibre.

Fibre comprising PAN-based polymers according to the invention can advantageously be used as a precursor in the manufacture of carbon fibre.

The present invention therefore also provides a method of producing carbon fibre, the method comprising carbonising a fibre comprising PAN-based polymer according to the invention.

PAN-based polymer according to the invention in the form of fibre can conveniently be converted into carbon fibre using techniques known in the art.

The invention will now be described with reference to the following examples which illustrates some preferred embodiments of the invention. However, it is to be understood that the particularity of the following description is not to supersede the generality of the preceding description of the invention.

EXAMPLES

Reference Example 1

Add 5 mol/L AN and 1.60×10⁻³ mol/L AIBN, together with the specified solvent to a Shlenk flask. The solution was degassed with nitrogen (e.g. about 20 min) to eliminate the dissolved oxygen. The flask was then charged with nitrogen and sealed. Then, the flask was placed in an oil bath held at a temperature of 60° C. for 12 hours. The reaction mixtures were diluted with DMSO, and the polymers precipitated in methanol and dried in a vacuum oven at 30-40° C. until constant weight. The results in FIG. 1 show how the solvent selection in acrylonitrile polymerisation can alter the results. It is evident that the solvent used has an effect on the monomer conversion rate and molecular weight of the PAN polymers obtained. EC, DMSO and PC are useful solvents for PAN preparation, resulting in a higher molecular weight and polymer yield than DMF (Dimethylformamide) and DMA (Dimethylacetamide).

Example 2

Add 6 mol/L acrylonitrile (AN) and 2% methyl methacrylates (MMA), and DMSO were added to a Shlenk flask. An initiator AIBN and a RAFT agent 4-Cyano-4-(phenylcarbonothioylthio)pentanoic acid were added into the reaction mixture at a molar ratio of 1:2, and AN to the RAFT agent ratio was 8500:1. The solution was bubbled with nitrogen for about 20 min to eliminate the dissolved oxygen. Then the flask was placed in an oil bath held at a temperature of 61° C. for 15 hours. The reaction mixtures were diluted with DMSO, and the polymers precipitated in methanol and dried in a vacuum oven at 30-40° C. until constant weight.

The reaction product was analysed by GPC, and the results are:

$M_n$=240072, and PDI=1.13

Similar results were obtained with methyl acrylate as the comonomer.

Example 3

Same procedure as in Example 2 was used in Example 3 except the AN to the RAFT agent ratio was 10000:1, with 2% MMA+ Itaconic acid as comonomers, and the polymerisation temperature was 65° C.

The GPC results are: $M_n$=200610, and PDI=1.11

Example 4

Same procedure as in Example 2 was used in Example 4, except that the solvent used was PC, and AN to RAFT ratio was 9000:1, without a comonomer used.

The GPC results are: $M_n$=465015, PDI=1.15

The invention claimed is:

1. Poly(acrylonitrile) homo- or co- RAFT polymer having (i) a number average molecular weight ($M_n$) of at least 150,000 g/mol, (ii) a dispersity (Ð) of less than 1.25, and (iii) a covalently bound residue of a RAFT agent.

2. The poly(acrylonitrile) homo- or co-polymer according to claim 1 having a dispersity (Ð) no greater than 1.20.

3. The poly(acrylonitrile) homo- or co-polymer according to claim 1 having a number average molecular weight ($M_n$) of at least 200,000 g/mol.

4. The poly(acrylonitrile) homo- or co-polymer according to claim 1 having a number average molecular weight ($M_n$) of at least 450,000 g/mol.

5. The poly(acrylonitrile) homo- or co-polymer according to claim 1 having covalently bound thereto residue of a dithiobenzoate or trithiocarbonate RAFT agent.

6. The poly(acrylonitrile) homo- or co-polymer according to claim 5, wherein the dithiobenzoate or trithiocarbonate RAFT agent is cyano functionalised, carboxylic acid functionalised, or cyano and carboxylic acid functionalised.

7. The poly(acrylonitrile) homo- or co-polymer according to claim 6, wherein the dithiobenzoate or trithiocarbonate RAFT agent is carboxylic acid functionalised.

8. The poly(acrylonitrile) homo- or co-polymer according to claim 1 in the form of fibre.

9. The poly(acrylonitrile) homo- or co-polymer according to claim 1 having covalently bound thereto residue of a RAFT agent selected from 1-8 or a RAFT agent precursor compound selected from 9-11:

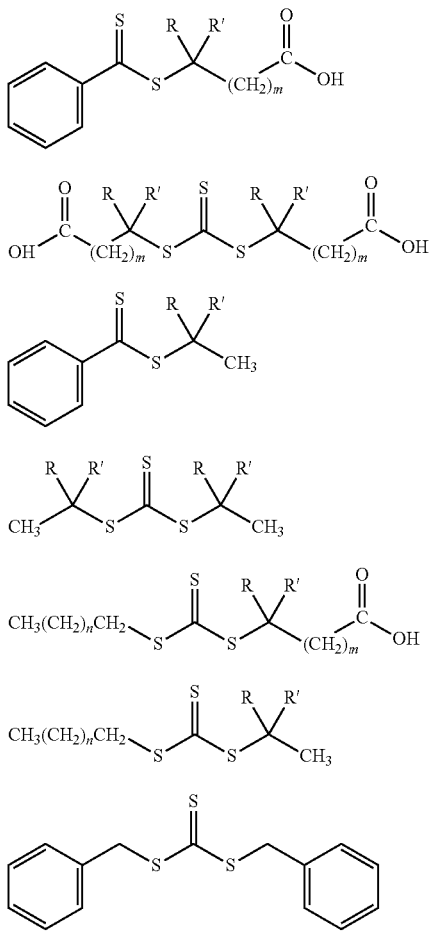
(1)
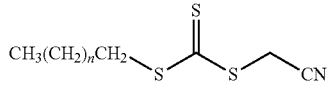
(2)
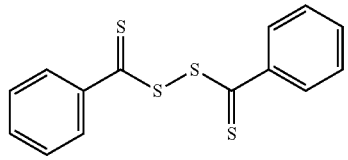
(3)
(4)
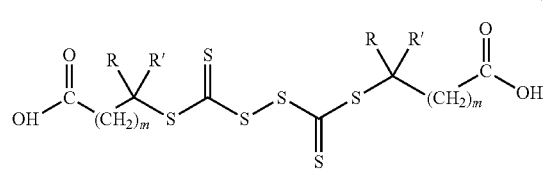
(5)
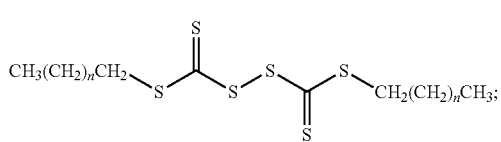
(6)
(7)
(8)
(9)
(10)
(11)
where the or each R is independently selected from H or CH$_3$, the or each R' is independently selected from H, CH$_3$, or CN, n=0-15, and m=0-10.
10. The poly(acrylonitrile) homo- or co-polymer according to claim 9, wherein the RAFT agent is 1 or 5.
11. Carbon fibre comprising carbonised residue of poly (acrylonitrile) homo- or co-polymer according to claim 1.
\* \* \* \* \*